(12) United States Patent
Price

(10) Patent No.: US 7,505,927 B2
(45) Date of Patent: Mar. 17, 2009

(54) EXTENDED MANUFACTURING ENVIRONMENT

(76) Inventor: Edward R. Price, 1 Kennedy La., Southboro, MA (US) 01772

( * ) Notice: Subject to any disclaimer, the term of this patent is extended or adjusted under 35 U.S.C. 154(b) by 590 days.

(21) Appl. No.: 10/619,173

(22) Filed: Jul. 14, 2003

(65) Prior Publication Data

US 2005/0015265 A1 Jan. 20, 2005

(51) Int. Cl.
*G06Q 30/00* (2006.01)
(52) U.S. Cl. .......................................... 705/26; 705/27
(58) Field of Classification Search .................. 705/7, 705/8, 26, 27, 28, 29, 9, 10
See application file for complete search history.

(56) References Cited

U.S. PATENT DOCUMENTS

| | | | |
|---|---|---|---|
| 4,887,206 A * | 12/1989 | Natarajan | 705/29 |
| 5,307,260 A * | 4/1994 | Watanabe et al. | 703/2 |
| 5,315,509 A * | 5/1994 | Natarajan | 705/28 |
| 5,570,291 A * | 10/1996 | Dudle et al. | 700/95 |
| 5,974,395 A * | 10/1999 | Bellini et al. | 705/9 |
| 6,295,513 B1 | 9/2001 | Thackston | |
| 6,360,254 B1 * | 3/2002 | Linden et al. | 709/219 |
| 6,490,493 B1 * | 12/2002 | Dharnipragada | 700/97 |
| 6,539,286 B1 * | 3/2003 | Jiang | 700/282 |
| 6,539,386 B1 | 3/2003 | Athavale et al. | |
| 6,587,827 B1 * | 7/2003 | Hennig et al. | 705/1 |
| 7,035,815 B1 * | 4/2006 | Henson | 705/26 |
| 2001/0051886 A1 | 12/2001 | Mitsutake et al. | |
| 2002/0007293 A1 * | 1/2002 | Clemens et al. | 705/7 |
| 2002/0013721 A1 * | 1/2002 | Dabbiere et al. | 705/7 |
| 2002/0023018 A1 * | 2/2002 | Kleinbaum | 705/26 |
| 2002/0035450 A1 | 3/2002 | Thackston | |
| 2002/0067370 A1 | 6/2002 | Forney et al. | |
| 2002/0082891 A1 | 6/2002 | McKay et al. | |
| 2002/0083057 A1 | 6/2002 | Zulpa et al. | |
| 2002/0116346 A1 * | 8/2002 | Blankenstein et al. | 705/80 |
| 2002/0178077 A1 * | 11/2002 | Katz et al. | 705/26 |
| 2002/0194304 A1 | 12/2002 | Cramer et al. | |
| 2003/0009410 A1 * | 1/2003 | Ramankutty et al. | 705/37 |
| 2003/0074424 A1 | 4/2003 | Giles et al. | |
| 2003/0225637 A1 * | 12/2003 | Pemberton et al. | 705/28 |
| 2004/0019604 A1 * | 1/2004 | Ballas et al. | 707/104.1 |
| 2004/0088422 A1 * | 5/2004 | Flynn et al. | 709/229 |
| 2004/0103046 A1 * | 5/2004 | Christoph et al. | 705/28 |

FOREIGN PATENT DOCUMENTS

JP 2000148888 A * 5/2000

OTHER PUBLICATIONS

Anonymous, "Material Handling company uses simulation to meet specification", dated Nov. 1993.*
"Arena PLM is a Complete Product Lifecycle Management Solution for Use From Concept Through End-of-Life" [online]. Arena Solutions [retrieved on Jun. 20, 2003]. Retrieved from the Internet:<URL:http://www.arenasolutions.com/product/features.html>, 6 pages.

(Continued)

*Primary Examiner*—Mark Fadok
(74) *Attorney, Agent, or Firm*—Cooley Godward Kronish LLP

(57) ABSTRACT

An extended manufacturing environment can receive, at a manufacturer's server, a communication from a customer of the manufacturer, automatically process the communication, and automatically transmit an order for supplies to a supplier of the supplies. The supplies, which are needed by the manufacturer to manufacture at least one product for the customer, can be directly ordered by the customer, without the customer having to wait for the manufacturer's approval.

38 Claims, 4 Drawing Sheets

OTHER PUBLICATIONS

"Datasweep Improves Performance at Manufacturing Services Firms" [online]. Jun. 1, 2003, Electro Manufacturing, ISSN:1041-052X; vol. 16; Issue 6 [retrieved on Jun. 6, 2003]. Retrieved from the Internet: <URL:http://global.factiva.com/en/arch/print_results.asp>, 2 pages.

"Fact Sheet—MAPICS Portal" [online] Mapics, Inc. Retrieved from the Internet: <URL: http://www.mapics.com>, 2 pages.

Foster T. A., "Opening a Portal to Supply-Chain Collaboration" [online]. Apr. 2003 [retrieved on Jun. 23, 2003]. Retrieved from the Internet: <URL: http:///www.supplychainbrain.com/archives/04.03.portal.htm?adcode=10>, 7 pages.

Grosvenor et al. "Cisco's eHub Initiative" [online]. From the Jul./Aug. 2001 Issue of Supply Chain Management Review [retrieved on Jun. 18, 2003]. Retrieved from the Internet: <URL:http://www.manufacturing.net/scm/index.asp?layout=article&articleid=CA154379>, 11 pages.

"MAPICS—MAPICS news" [online]. Mapics, Inc. [retrieved on Jun. 23, 2003]. Retrieved from the Internet: <URL: http://www.mapics.com/customers/ResourceCenter/hightech/news.asp>, 2 pages.

"MAPICS Product Overview—MAPICS Portal" [online] Mapics, Inc. Retrieved from the Internet: <URL: http://www.mapics.com>, 9 pages.

"Masstech EMS Sees Immediate Results After Deploying MAPICS" [online]. Atlanta: Jun. 24, 2003 [retrieved on Oct. 27, 2003]. Retrieved from the Internet: <URL: http://www.mapics.com/company/PressRoom/03releases/pr-030624.asp>, 3 pages.

"New Buyer-Supplier Role Portal Helps MAPICS Customer, Mitsubishi Caterpillar Forklift Europe, Decrease On-Hand Inventory by More Than $10 Million Within Six Months" [online]. Atlanta: Jun. 27, 2002. [retrieved on Nov. 9, 2003]. Retrieved from the Internet: <URL: http//www.mapics.com/company/PressRoom/02releases/pr-020627.asp>, 2 pages.

"Outsourcing. It's No Longer an Option", APICS—The Performance Advantage, Jun. 2003, p. 8.

"Seamless Virtual Communities—MAPICS Portal" [online] Mapics, Inc. Retrieved from the Internet: <URL: http://www.mapics.com>, 2 pages.

"Solutions: By Functional Area. Manufacturing" [online]. Lilly Software Associates, Inc. [retrieved on Jun. 17, 2003]. Retrieved from the Internet: <URL: http://www.lillysoftware.com/products/VISUAL_manufacturing/>, 1 page.

"Solutions: By Functional Area. Manufacturing: Engineering Change Notice" [online]. Lilly Software Associates, Inc. [retrieved on Jun. 17, 2003]. Retrieved from the Internet: <URL: http://www.lillysoftware.com/products/visual_manufacturing/ntp_ec.cfm>, 1 page.

"Solutions: By Functional Area. Manufacturing: Quality Management" [online]. Lilly Software Associates, Inc. [retrieved on Jun. 17, 2003]. Retrieved from the Internet: <URL: http://www.lillysoftware.com/products/visual_manufacturing/ntp_qm.cfm>, 3 pages.

"Sun One Portal Virtualizes Manufacturing Processes, Supplier Management and Collaboration" [online]. Chicago, IL: National Manufacturing Week (Booth #800), Mar. 4, 2003 [retrieved on Nov. 9, 2003]. Retrieved from the Internet: <URL: http://www.sun.com/smi/Press/sunfalsh/2003-03/sunflash.20030304.3.html>, 3 pages.

\* cited by examiner

EXTENDED MANUFACTURING ENVIRONMENT

TECHNICAL FIELD

The invention generally relates to methods and systems of manufacturing. More particularly, the invention relates to methods and systems for providing an extended manufacturing environment.

BACKGROUND INFORMATION

A portal server can be used to deliver some information associated with a process. The information can be delivered to a user via a browser client over the Internet or via a corporate intranet. For example, a customer can use a portal to place an order and also to see if any existing order is yet completed.

SUMMARY OF THE INVENTION

In accordance with the invention, a plurality of remote clients can be connected over a network to a geographically distant plant of a manufacturer. Users of the remote clients may be, for example, customers of the manufacturer. For example, a customer of a contract manufacturer, in operating the remote client, can be provided intimate access to, and detailed information about, the contract manufacturer's internal manufacturing equipment and process. According to one advantage of the invention, the user need not be present physically at the manufacturer's plant in order to view and manipulate the critical and detailed manufacturing information. The information can include order status information, but also much more detailed information about the manufacturer's internal equipment and/or process, thus allowing a remote user to view details previously only known and accessible to the manufacturer itself.

The user may, based on the manufacturing information received over the network, act upon the information in real-time. For example, without the need for a telephone call or an e-mail to the manufacturer, a customer may submit automatically an engineering change order to a product being manufactured, and then subsequently electronically order, without having to wait for the manufacturer's approval, the supplies needed to fulfill the engineering change order. Consequently, according to another advantage of the invention, the speed with which manufacturing decisions are made is increased, and revenue and cost control opportunities are more readily realized. Needless tension between, for example, customers and contract manufacturers is thereby eliminated.

In one aspect, the invention generally involves a method for providing an extended manufacturing environment. The method includes receiving, at a manufacturer's server, a communication from a customer of the manufacturer. The manufacturer's server automatically processes the communication and automatically transmits an order for supplies to a supplier of the supplies. The supplies are needed by the manufacturer to manufacture at least one product for the customer.

In another aspect, the invention generally relates to an article of manufacture having computer-readable program means embodied therein for providing an extended manufacturing environment. The article includes computer readable program means for receiving, at a manufacturer's server, a communication from a customer of the manufacturer, automatically processing the communication, and automatically transmitting an order for supplies to a supplier of the supplies, where the supplies are needed by the manufacturer to manufacture at least one product for the customer.

One or both of these aspects of the invention can include various features. For example, the communication can include an order for the at least one product, a request to change an existing order for the at least one product, or a request for supplies. A simulation can be run to determine whether the order can be filled by the manufacturer, or an impact of making the change request such as a loss of ship date, a surcharge for re-assembling the at least one product, and/or an unexpected increase in price due to a change in sub-components of the at least one product. Also, the manufacturer's server can handle a request from the customer for detailed product quality information.

In yet another aspect, the invention generally features a system for providing an extended manufacturing environment. The system includes a manufacturing interface module configured to receive a communication from a customer of a manufacturer, automatically process the communication, and automatically pass control to an ordering module. The ordering module is configured to automatically transmit an order for supplies to a supplier of the supplies. The supplies are needed by the manufacturer to manufacture at least one product for the customer.

This aspect of the invention can include various features. For example, the communication can include an order for the at least one product, a request to change an existing order for the at least one product, or a request for supplies. A simulation module can run a simulation to determine whether the order can be filled by the manufacturer, or an impact of making the change request such as a loss of ship date, a surcharge for re-assembling the at least one product, and/or an unexpected increase in price due to a change in sub-components of the at least one product. Also, the manufacturing interface module can be further configured to receive from the customer a request for detailed product quality information.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DESCRIPTION

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combination or permutations are not made express herein, without departing from the spirit and scope of the invention.

Figure 1:
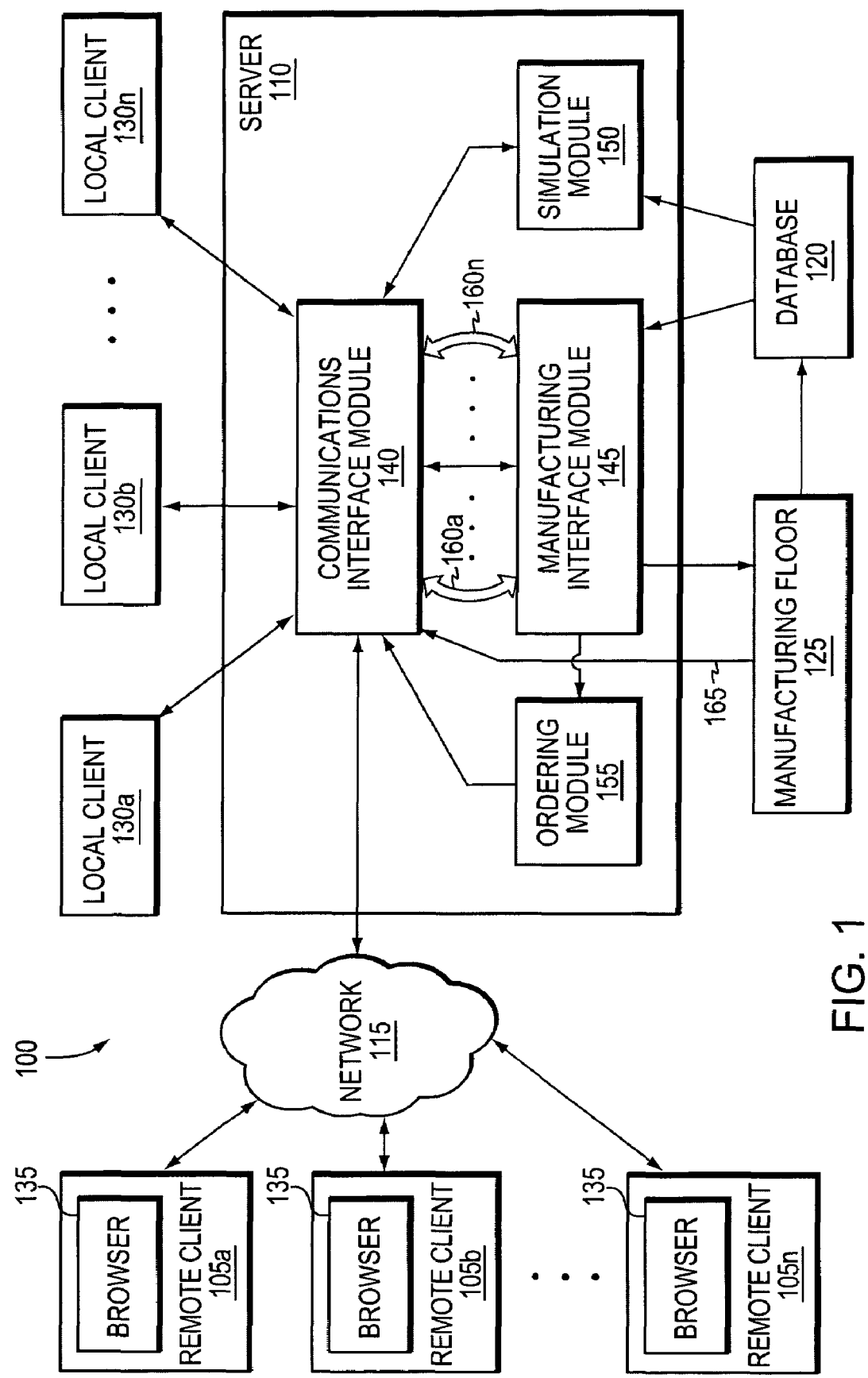
FIG. 1 is a block diagram of an illustrative embodiment of a system for providing an extended manufacturing environment in accordance with the invention.

In general, the invention pertains to methods and systems for providing an extended manufacturing environment. In broad overview, FIG. 1 depicts a system 100 for providing an extended manufacturing environment according to an illustrative embodiment of the invention. The system 100 includes a plurality of first computing devices, e.g., remote clients 105a-105n, in communication with a second computing device, e.g., server 110, over a network 115. Also included in the system 100 is a third computing device, e.g., database 120, which is in communication with the server 110, and a manufacturing floor 125 that is in communication with the server 110 and the database 120. A manufacturer, such as, for example, a contract manufacturer, operates the manufacturing floor 125. Optionally, fourth computing devices, e.g., local clients 130a-130n, are in direct communication with the server 110.

In general, users of the remote clients 105 can be customers of the manufacturer operating the manufacturing floor 125, suppliers for the manufacturer, employees of the manufacturer, distributors for the customers of the manufacturer, or future producers for the customers of the manufacturer. For example, the manufacturer can be a low volume producer engaged by the customer to produce a prototype, or a small quantity of one or more products, and the future producer for the customer can be a high volume producer who will eventually take the completed prototype, or the small quantity of one or more products, and produce it, or them, in large volumes. Employees of the manufacturer may additionally, or alternatively, use one or more of the local clients 130a-130n, to directly communicate with the server 110.

In one embodiment, the network 115 is, for example, a local-area network (LAN), such as a company Intranet, or a wide area network (WAN), such as the Internet or the World Wide Web. Users of the remote clients 105 can be connected to the network 115 through a variety of connections including, but not limited to, standard telephone lines, LAN or WAN links (e.g., T1, T3, 56 kb, X.25), broadband connections (e.g., ISDN, Frame Relay, ATM), or wireless connections. The connections can be established using a variety of communication protocols (e.g., HTTP, TCP/IP, IPX, SPX, NetBios, Ethernet, RS232, and direct asynchronous connections).

Each of the remote clients 105 and the local clients 130 can be any personal computer, Windows-based terminal, Network Computer, wireless device, information appliance, RISC Power PC, X-device, workstation, mini computer, main frame computer, personal digital assistant, set top box, handheld device, or other computing device that is capable of both presenting information/data to, and receiving commands from, a user of the remote client 105 or the local client 130, as the case may be. For example, each of the remote clients 105 and the local clients 130 may include a visual display device (e.g., a computer monitor), a data entry device (e.g., a keyboard), persistent and/or volatile storage (e.g., computer memory), a processor, and a mouse. In one embodiment, as shown, each of the remote clients 105 includes a web browser 135, such as, for example, the Internet Explorer™ program developed by Microsoft Corporation of Redmond, Wash., to connect to the World Wide Web.

The server 110 can be any computing device capable of delivering information/data to, and receiving commands from, the remote clients 105, over the network 115, and the local clients 130. In one embodiment, the server 110 includes a communications interface module 140, a manufacturing interface module 145, a simulation module 150, and an ordering module 155. The modules 140, 145, 150, and 155 may be implemented as a software program and/or as a hardware device, such as, for example, an ASIC or an FPGA.

In the illustrative embodiment shown, the database 120 is a separate server from the server 110. Alternatively, the database 120 is part of the server 110. The database 120 includes storage, or storage is connected to the database 120, for storing and managing data. In another embodiment, the aforementioned modules 140, 145, 150, and 155 are distributed over several servers in communication with each other over the network 115, or over another network (not shown). Two or more of the modules 140, 145, 150, and 155 may be combined into a single module, such that the functions, as described below, performed by two or more of the modules 140, 145, 150, and 155 are performed by the single module. Alternatively, any one of the modules 140, 145, 150, or 155 may be implemented as multiple modules, such that the functions, as described below, performed by any one of the modules 140, 145, 150, and 155 are performed by the multiple modules.

The manufacturing floor 125 can interface with the communications interface module 140, the manufacturing interface module 145, and the database 120. Information/data concerning the manufacturing processes occurring on the manufacturing floor 125 and/or information relating to the supply of supplies is uploaded to the database 120. For example, order status information, product quality information, and/or information of particular interest to suppliers is uploaded to the database 120. Such exemplary information can be uploaded to the database 120 by a human operator. Alternatively, the information is automatically uploaded to the database 120 by, for example, an electronic scanner. For instance, as the product being manufactured passes from one workstation to the next, the scanner is used to scan a barcode on the product, thereby recording, in real-time, the exact location of the product in the manufacturing process. A variety of other means can be used to upload information/data concerning the manufacturing processes to the database 120.

In the depicted embodiment of FIG. 1, the communications interface module 140 interfaces with the network 115, the local clients 130, the manufacturing interface module 145, the simulation module 150, the ordering module 155, and the manufacturing floor 125. In one embodiment, the communications interface module 140 receives requests or commands from the remote clients 105 and/or the local clients 130 and transfers those requests or commands to the manufacturing interface module 145 or to the simulation module 150, as appropriate. The communications interface module 140 may also return resulting information/data from the manufacturing interface module 145, the simulation module 150, the ordering module 155, or the manufacturing floor 125 to the remote clients 105 and/or to the local clients 130.

The communications interface module 140 can provide a web portal to users of the remote clients 105. Moreover, the communications interface module 140 can provide a different web page for each user of a remote client 105. For example, each customer can be provided with a customized web page by the communications interface module 140. Similarly, each supplier, employee, distributor for a customer, and/or future producer for a customer can also be provided with a customized web page by the communications interface module 140. Additionally, where appropriate, sub-groups of the same user of a remote client 105 can be provided with a different web page by the communications interface module 140. For instance, the engineering group and the sales group of the same customer can be provided with different customized views. The users, or sub-groups of the same user, may customize their own web page, or, alternatively, the web-page may be customized for them by, for example, the manufacturer operating the server 110.

The communications interface module 140 can also provide any number of channels 160a-160n between the communications interface module 140 and the manufacturing interface module 145. Each channel 160 allows for a different channelized view of the database 120 and the manufacturing processes occurring on the manufacturing floor 125. For instance, in one embodiment, the manufacturer desires to provide certain customers with access to both order status information and product quality information, but provide other customers with access to only order status information. Each customer is, therefore, provided a specific channelized view of the database 120, via a specific channel 160, based on the access the customer is granted by the manufacturer. The channelized view restricts the customer's view to certain information stored in the database 120. As another example, the manufacturer may desire to provide certain customers with access to manufacturing process information relating to workstation A, workstation B, and workstation C, but provide other customers with access to only manufacturing process information relating to workstation A. The channels 160 may be used to restrict a customer's view of the manufacturing processes in such a fashion. Similarly, each supplier, employee, distributor, future producer, and/or user sub-group may additionally, or alternatively, be provided with a different channelized view of the database 120 and the manufacturing processes occurring on the manufacturing floor 125. Moreover, any number of other channels can be provided by the communications interface module 140 between the communications interface module 140 and another module, such as, for example, the simulation module 150.

Additionally, the communications interface module 140 can control which users are able to interact with one another through, for example, discussion threads, alerts, or video conferencing, as described below. In one embodiment, the communications interface module 140 controls company-to-company relationships. For example, customer A is permitted by the communications interface module 140 to interact with customer B and supplier C, but not with customer D or supplier E. Any variety of restrictions on interaction between customers, suppliers, employees, distributors, and/or future producers may be implemented by the communications interface module 140.

In one embodiment, the communications interface module 140 supports discussion threads and the posting of alerts. For example, users of the remote clients 105 and/or the local clients 130 can post messages to one or more discussion boards hosted by the communications interface module 140. The messages may, for example, pertain to proposed changes to one or more products being manufactured at the manufacturing floor 125. A user posting a message can then send an alert to the other users, notifying them to check the discussion board. The alert can be automatically sent to all users of the remote clients 105 and the local clients 130 or the user posting the message can opt to send the alert to a chosen sub-set of users. The user sending the alert can monitor, for example, which recipients have acknowledged receipt of the alert. The users receiving the alert can read the message posted at the discussion board and, optionally, post their own message.

The communications interface module 140 can also support video-streaming technology and present, for example, products in process, defects, or problems on the manufacturing floor 125 to users of the remote clients 105 and/or the local clients 130. The manufacturing floor 125 can be directly connected to the communications interface module 140, via a link 165, to provide such information. For example, an engineer located at manufacturing floor 125 may hold an overall top level product to a camera located at manufacturing floor 125. The engineer may show the latest design, point out any manufacturing or assembly problems associated therewith, and suggest possible solutions. The image of the product and/or engineer is sent to users of the remote clients 105 and/or the local clients 130, via the link 165 and the communications interface module 140, thereby obviating the need for the users to be physically present at the manufacturing floor 125. As another example, an engineer can hold a low level component, used in manufacturing the overall top level product, to the camera and provide one or more suppliers of the component, located at the remote clients 105, with a real-time demonstration of any issues that exist. As such, the one or more suppliers need not be physically present at the manufacturing floor 125 to deal with any arising component issues. The time required for the one or more suppliers to react to the component issues by, for example, shipping a set of corrected components is, therefore, reduced by the present invention.

In still another embodiment, the communications interface module 140 supports video-conferencing between users of the remote clients 105 and/or the local clients 130. Users of the remote clients 105 and/or the local clients 130 can, therefore, participate in real-time discussions/meetings, without having to be present at the same geographic location.

In yet another embodiment, users of the remote clients 105 can transfer files to the communications interface module 140 for eventual storage in the database 120. For example, the users can send Excel files over the network 115 to the communications interface module 140. Exemplary Excel files that can be transmitted to the communications interface module 140 include, but are not limited to, files containing a Bill of Materials or an Approved Vendor List. Alternatively, the user may transmit other types of files to the communications interface module 140. The communications interface module 140 initially stores the transmitted files in, for example, a library. The manufacturing interface module 145, or, alternatively, another module (not shown), can then be executed to automatically import the transmitted files into the database 120. Because the user may post the files directly to, for example, the library of the communications interface module 140, the user need not separately mail or e-mail the files to the manufacturer. Moreover, the automatic importing of the transmitted files into the database 120 obviates the need for the manufacturer to manually upload information, contained in the transmitted files, to the database 120.

The manufacturing interface module 145 interfaces with the communications interface module 140, the ordering module 155, the database 120, and the manufacturing floor 125. The manufacturing interface module 145 provides users with a detailed view into the operations of the manufacturing floor 125. In one embodiment, the manufacturing interface module 145 receives, through communications interface module 140, communications from users of the remote clients 105 and/or the local clients 130. The manufacturing interface module 145 processes the communications and returns any results, through the communications interface module 140, to the remote clients 105 and/or to the local clients 130. The results can be presented to the user, by the communications interface module 140, in, for example, a worksheet format or a graphical format. Alternatively, the results can be presented to the user in other formats.

For example, a customer may place an order for a product at a remote client 105. The order, after having passed through the network 115 and the communications interface module 140 to the manufacturing interface module 145, is processed by the manufacturing interface module 145 and sent to the manufacturing floor 125 to be filled. As described in greater detail below, prior to submitting the order for the product, the customer can first run a simulation via the simulation module 150 to determine whether the order can be filled by the manufacturer. Moreover, as also described in greater detail below, following placement of the order, the manufacturing interface module 145 can automatically pass control to the ordering module 155, which can automatically transmit an order for supplies to a supplier of the supplies without any further human interaction and without requiring approval from the manufacturer.

As another example, a customer at a remote client 105 requests, without delay, and without consequent missed revenue opportunities and/or missed opportunities to control costs, real-time changes to an existing order for a product. The change request is again received by the manufacturing interface module 145, processed, and sent to the manufacturing floor 125 to be filled. Again, as described in greater detail below, prior to making the change request, a customer can first run a simulation via the simulation module 150 to determine the impacts of making such a change request. Moreover, as also described in greater detail below, following the change request, the manufacturing interface module 145 can automatically pass control to the ordering module 155, which can automatically transmit an order for supplies to a supplier of the supplies without any further human interaction and without requiring approval from the manufacturer.

Users of remote clients 105 and/or local clients 130 can request manufacturing information from the manufacturing interface module 145. The manufacturing interface module 145 responds to such requests in real-time by returning to the users the results stored, as described above, in the database 120. The manufacturing interface module 145 obviates the need for, and the burden of, direct contact between users and the manufacturer by, for example, telephone calls, e-mails, or other slow means of communication.

In one embodiment, users of remote clients 105 and/or local clients 130 request order status information. In addition to providing users with basic status information, such as whether the order is already fulfilled or in the midst of the process of being fulfilled, the manufacturing interface module 145 can return to the user much more detailed order status information. For example, the manufacturing interface module 145 informs users how many of each ordered product are at workstation A, at workstation B, at workstation C, etc. As another example, the manufacturing interface module 145 informs users how many of each ordered product are in the process of being made, how many are made, how many are being tested, how many are currently being held for delivery, and how many have been delivered. In other words, the order status information provided to the user is detailed stock status information. In one embodiment, this detailed stock status information is provided for the overall top level product. Alternatively, the detailed stock status information is provided for sub-components used in manufacturing the overall top level product. As yet another example, the manufacturing interface module 145 informs the users of what supplies are needed to complete the process at each workstation, which of those supplies are on order, when they are due in, and/or what shortages may, or will, result. As discussed in greater detail below, customers can initiate the process of ordering the missing supplies from a supplier by, for example, directly requesting that certain supplies be ordered.

The manufacturing interface module 145 also responds to product quality information inquiries from users of the remote clients 105 and/or the local clients 130. For instance, a user may require information relating to manufacturing defects. The user may, for example, desire to know what percentage of completed products were defective or were rejected for faults. The user may, however, require more detailed product quality information, such as, for example, manufacturing defect information relating to each particular low level component used in manufacturing the overall top level product. The user may desire to know, for example, for each low level component, the percentage that were defective and a breakdown of the different reasons for the particular defects. The manufacturing interface module 145 obtains any such requested information from the database 120 and returns the results to the user. In other embodiments, the manufacturing interface module 145 provides other detailed types of statistical process control information, relating either to the overall top level product or to the low level components used in assembling the overall top level product.

In yet another embodiment, suppliers at the remote clients 105 can, in particular, be provided with specific information of interest to them by the manufacturing interface module 145. For example, the manufacturing interface module 145 can provide a supplier, in real-time, with the status of one or more orders for supplies submitted to the supplier by, as described below, a customer of the manufacturer or an employee of the manufacturer. In one such embodiment, the supplier is presented with a list of newly submitted orders for supplies and given the option to accept or reject the submitted orders for supplies. The supplier can accept/reject the submitted orders for supplies in total, or, alternatively, the supplier can accept/reject different portions of the submitted orders for supplies. For example, the supplier may decide to accept to supply certain supplies for a particular product, but not others. In one embodiment, a user may send a supplier an alert, notifying the supplier of a newly submitted order for supplies.

In another such embodiment, the manufacturing interface module 145 returns to the supplier information, stored in the database 120, relating to the consumption of supplies. For example, the percentage of delivered supplies consumed in assembling a finished product is provided by the manufacturing interface module 145 to the supplier. In such a fashion, the supplier can, as can a customer of the manufacturer, as described above, monitor and track supply status information, including any shortages or missing supplies that may result. The supplier can also, among other things, suggest the further purchase of supplies, provide information relating to expected delivery dates, and/or provide pricing information relating to the supplies. The supplier can do so, as discussed above, via the discussion boards supported by the communications interface module 140.

The manufacturing interface module 145 can also provide the supplier with delivery performance information tracked and stored in the database 120. For example, the supplier can be informed as to any orders for supplies which are late. Moreover, the supplier can be informed for example, as to what percentage of received supplies were delivered on time and/or as to which percentage of the supplies were defective. This information can be, for example, historical information.

In one embodiment, the simulation module 150 interfaces with the communications interface module 140 and, through the database 120, the manufacturing floor 125. Using the manufacturing information stored in the database 120, the simulation module 150 can run real-time simulations on demand for users of the remote clients 105 and/or the local clients 130. For example, prior to placing an order for a product as described above, a customer can input information about an intended product, such as, for example, the desired specifications, quantity, delivery time, and price. The simulation module 150 receives the inputted information, via the communications interface module 140, and simulates whether the customer-specified product can be manufactured by the manufacturer. If so, the simulation module 150 notifies the customer of it and prompts the customer to place, or to reject, the order. In performing the simulation, the simulation module 150 can perform both capacity planning/scheduling and materials planning. Capacity planning/scheduling can involve determining what resources (e.g., human resources, plant and equipment, etc.) would be consumed by the order and when the manufacturing floor 125 could, or should, actually process the order. Materials planning can involve determining what parts and/or other such supplies are need to complete the order, which of those supplies are on hand, and which would need to be ordered.

In another embodiment, the simulation module 150 is used to run real-time simulations of the impacts of implementing a change request. As an illustrative example, a customer may have initially placed an order for 1000 items of product A and 1000 items of product B. Over time, the customer's demand may change to 1500 items of product A and 500 items of product B. Prior to implementing the change request, the customer can request the critical impacts of modifying the order, such as, for example, a loss of ship date, a surcharge for re-assembling the product, and/or an unexpected increase in price due to a change in sub-components of the product. The simulation module 150 simulates the impacts of changing the existing order, determines the parameters requested by the customer, and returns the requested parameters to the customer for consideration. The customer may then accept or reject the change request.

The ordering module 155 interfaces with the communications interface module 140 and the manufacturing interface module 145. The ordering module 155 can be used by customers or employees at the remote clients 105, and/or by employees at the local clients 130, to electronically order supplies from suppliers who, in fact, support the electronic ordering of supplies (e.g., suppliers who support the electronic data interchange (EDI) standard). In one embodiment, a customer at a remote client 105 initiates the electronic ordering of supplies. For example, as discussed above, the customer sends, over the network 115 to the server 110, an order for a product or a request to change an existing order. Such a communication is received by the manufacturing interface module 145 and is processed by the manufacturing interface module 145. In one embodiment, the manufacturing interface module 145, without any further human interaction and without requiring approval from the manufacturer itself, then passes control to the ordering module 155. The ordering module 155 then automatically transmits an order for supplies, through the communications interface module 140 and the network 115 to a supplier of the supplies, for example a supplier located at a remote client 105. The supplier receives the order, interacts with the order over the network 115, as described above, fills the portion of the order it has accepted to supply, and ships that portion of the requested supplies to the manufacturer operating the manufacturing floor 125.

As another example, a customer may directly submit a request for supplies, without placing a new product order or requesting a change to an existing order, through the network 115 and the communications interface module 140, to the manufacturing module 145. The customer may do so, for example, where the customer has, as described above, requested detailed order status information and learned that supplies are missing or that shortages may soon result. As before, the manufacturing interface module 145 receives the communication (in this case, the request for supplies) and, without any further human interaction and without requiring approval from the manufacturer itself, automatically processes the communication. The manufacturing interface module 145 then passes control to the ordering module 155, which, as described above, automatically transmits an order for supplies to a supplier of the supplies. The supplier receives the order, interacts with the order over the network 115, as described above, fills the portion of the order it has accepted to supply, and ships that portion of the requested supplies to the manufacturer operating the manufacturing floor 125.

In another embodiment, where the customer wishes to use a specific supplier who does not support the electronic ordering of supplies, the customer may nevertheless initiate an order of supplies from that supplier. For example, the customer submits a request for supplies, through the network 115 and the communications interface module 140, to the manufacturing interface module 145. The manufacturing interface module 145 receives the request for supplies, processes it, and then prints a hard-copy of the purchase order. The hard-copy of the purchase order is mailed by the manufacturer to the supplier in question. The supplier receives the order, fills the portion of the order it accepts to supply, and ships that portion of the requested supplies to the manufacturer operating the manufacturing floor 125. Again, a supplier at a remote client 105 can also interact with the order, as described above, over the network 115.

Optionally, prior to the ordering module 155 transmitting the order for supplies, or prior to the manufacturing interface module 145 printing the hard-copy of the purchase order, the manufacturing interface module 145, or, alternatively, another separate module (now shown), determines an appropriate supplier. For example, the manufacturing interface module 145 considers the costs and shipping times of the various available suppliers and/or any other customer inputted information. Details relating to the appropriately determined supplier may then be returned to the customer who may, or may not, use any such information in submitting a direct request for supplies.

Figure 2A:
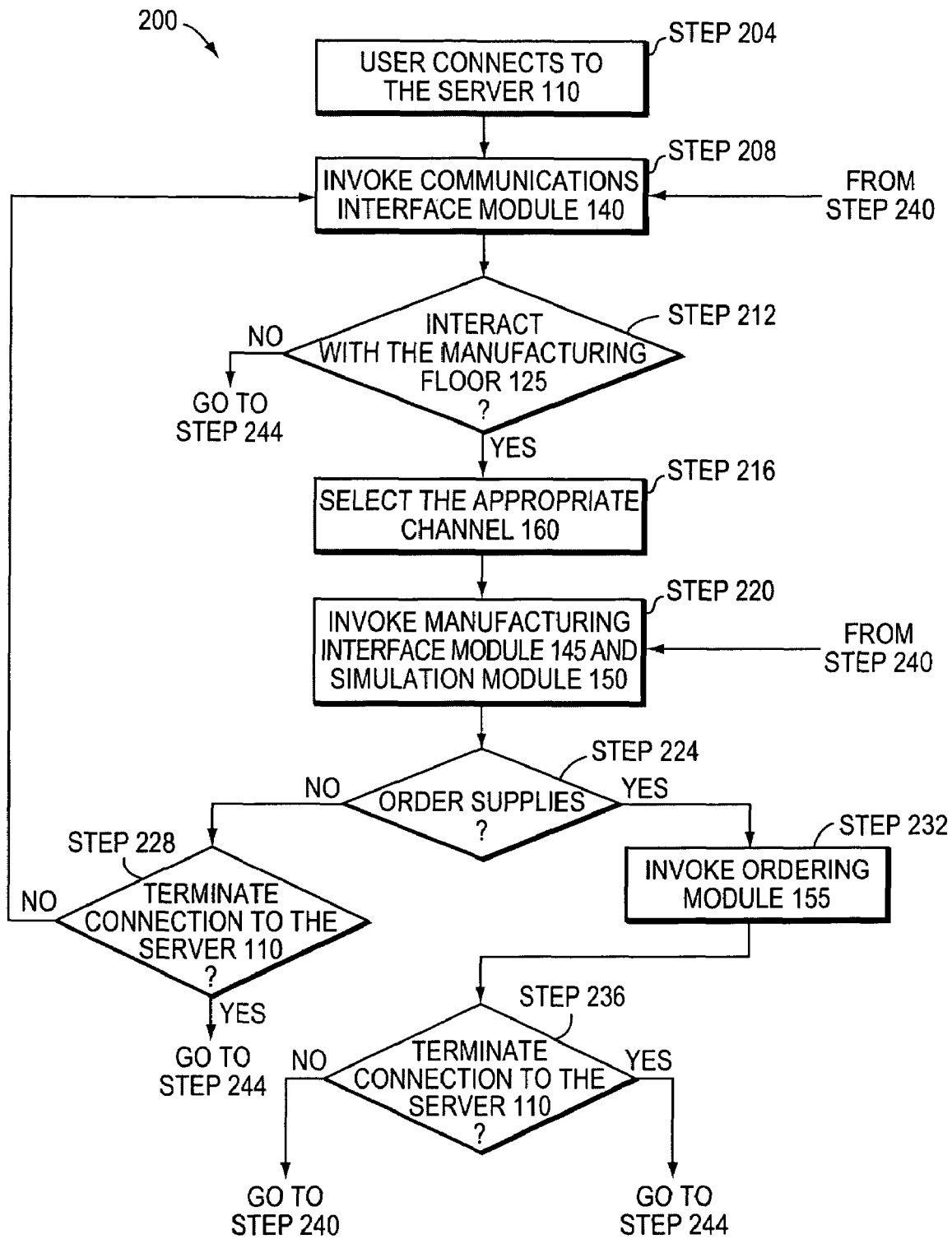
FIGS. 2A and 2B are flow diagrams of an illustrative embodiment of a method for providing an extended manufacturing environment in accordance with the invention.
Figure 2B:
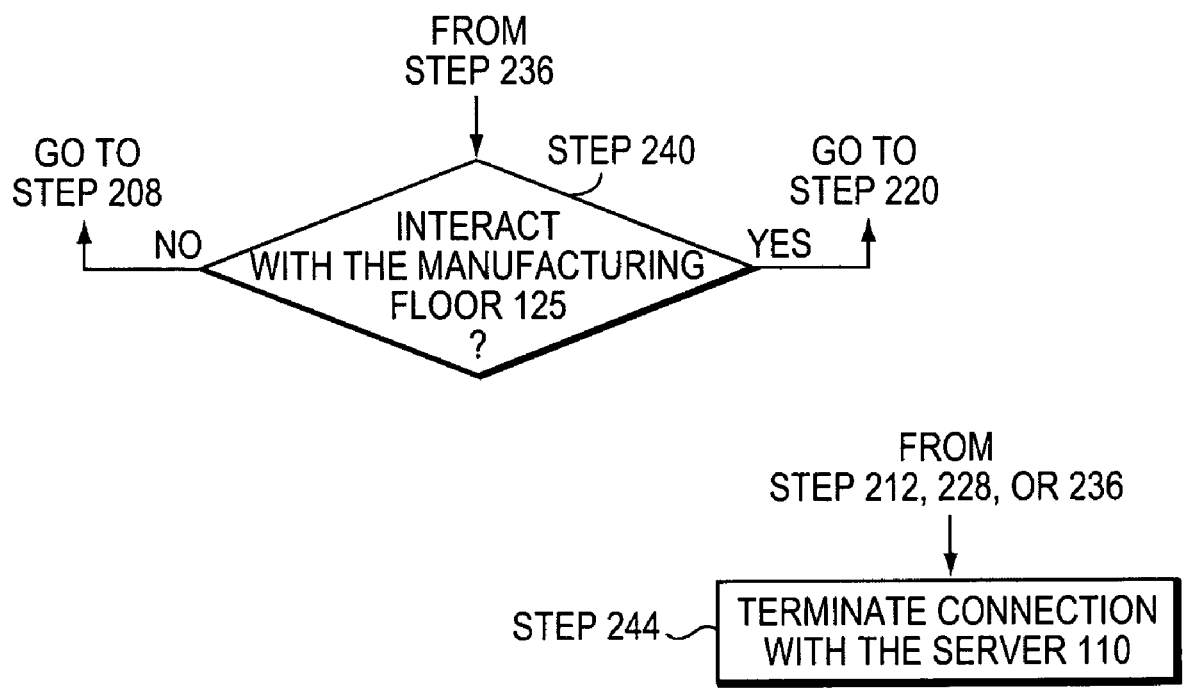

Referring now to FIGS. 2A-2B, one embodiment of a method 200 for providing an extended manufacturing environment, using the exemplary embodiment of FIG. 1, is illustrated. At step 204, a user of a remote client 105 or of a local client 130 connects to the server 110. The communications interface module 140 is invoked at step 208. When the communications interface module 140 is invoked, the user may, for example, post messages to one or more discussion boards, send alerts, view a live video stream of the manufacturing floor 125, or engage in a live video conference with other users of the remote clients 105 and/or the local clients 130, as described above.

At step 212, the user decides whether to interact with the manufacturing floor 125 by, for example, requesting information/data from, and/or supplying commands to, the manufacturing interface module 145 and/or the simulation module 150. If the user decides not to interact with the manufacturing floor 125, the user's connection to the server 110 is terminated at step 244. If, on the other hand, the user does decide to interact with the manufacturing floor 125, the communications interface module 140, at step 216, selects the appropriate channel 160 to provide the user with a specific channelized view of the manufacturing floor 125. The manufacturing interface module 145 and the simulation module 150 are then invoked, at step 220, by the server 110 and executed to perform any of their aforementioned tasks. For example, as described above, the manufacturing interface module 145 may be used to place an order for a product with the manufacturing floor 125, to change an existing order for a product, to request detailed order status information, to request detailed product quality information, and/or, in the case of suppliers, to provide the suppliers with specific information of interest to them and to receive instructions/commands from them relating to the acceptance/rejection of submitted orders for supplies. The simulation module 150 may be used to simulate the placement of an order for a product and/or to simulate the impacts of changing an existing order for a product.

The user may remain in step 220 as long as the user desires and may perform one or any number of the aforementioned tasks as many times as the user desires. For example, a customer can request detailed order status information and detailed product quality information for an existing order, run a first simulation for a first proposed change request, reject the first proposed change request, run a second simulation for a second proposed change request, change the existing order based on the second simulation result, run a third simulation for a first proposed order for a new product, reject the first proposed new product order, run a fourth simulation for a second proposed new product order, and place an order for a new product based on the fourth simulation result. As will be recognized by one skilled in the art, any combination of the above described tasks may be performed by the customer.

Following interaction with the manufacturing floor 125, it is decided, at step 224, whether to order supplies. For example, where the user has placed an order for a product or requested a change to an existing order, the manufacturing interface module 145 may be configured to automatically pass control to the ordering module 155, which, as described above, is configured to automatically transmit and order for supplies to a supplier of the supplies. Alternatively, the user may make a direct request for supplies, as described above. Where the manufacturing interface module 145 is not so configured, or the user makes no such direct request for supplies, the user, at step 228, either decides to terminate, at step 244, connection to the server 110 or to again post messages to one or more discussion boards, send alerts, view a live video stream of the manufacturing floor 125, or engage in a live video conference, via the communications interface module 140, at step 208. If, on the other hand, the manufacturing interface module 145 is configured to automatically pass control to the ordering module 155 following an order for a new product or a request to change an existing order from the customer, or, alternatively, if the user makes a direct request for supplies, the ordering module 155 is invoked at step 232. As described above, the ordering module 155 places an electronic order for supplies with a supplier of the supplies, for example a supplier at a remote client 105. In an alternative embodiment, as discussed above, where the supplier does not support the electronic ordering of supplies, the manufacturing interface module 145 may print a hard-copy of the user-initiated order for supplies and the hard-copy of the order may be mailed to the appropriate supplier.

Following placement of the order for supplies, the user again decides, at step 236, whether to terminate connection to the server 110. If the user does not desire to terminate connection to the server 110, the user decides, at step 240, to either interact with the manufacturing floor 125, in which case the manufacturing interface module 145 and the simulation module 150 are again invoked at step 220, or to again post messages to one or more discussion boards, send alerts, view a live video stream of the manufacturing floor 125, or engage in a live video conference, via the communications interface module 140 at step 208. If the user desires to terminate the connection to server 110, it is done at step 244.

Figure 3:
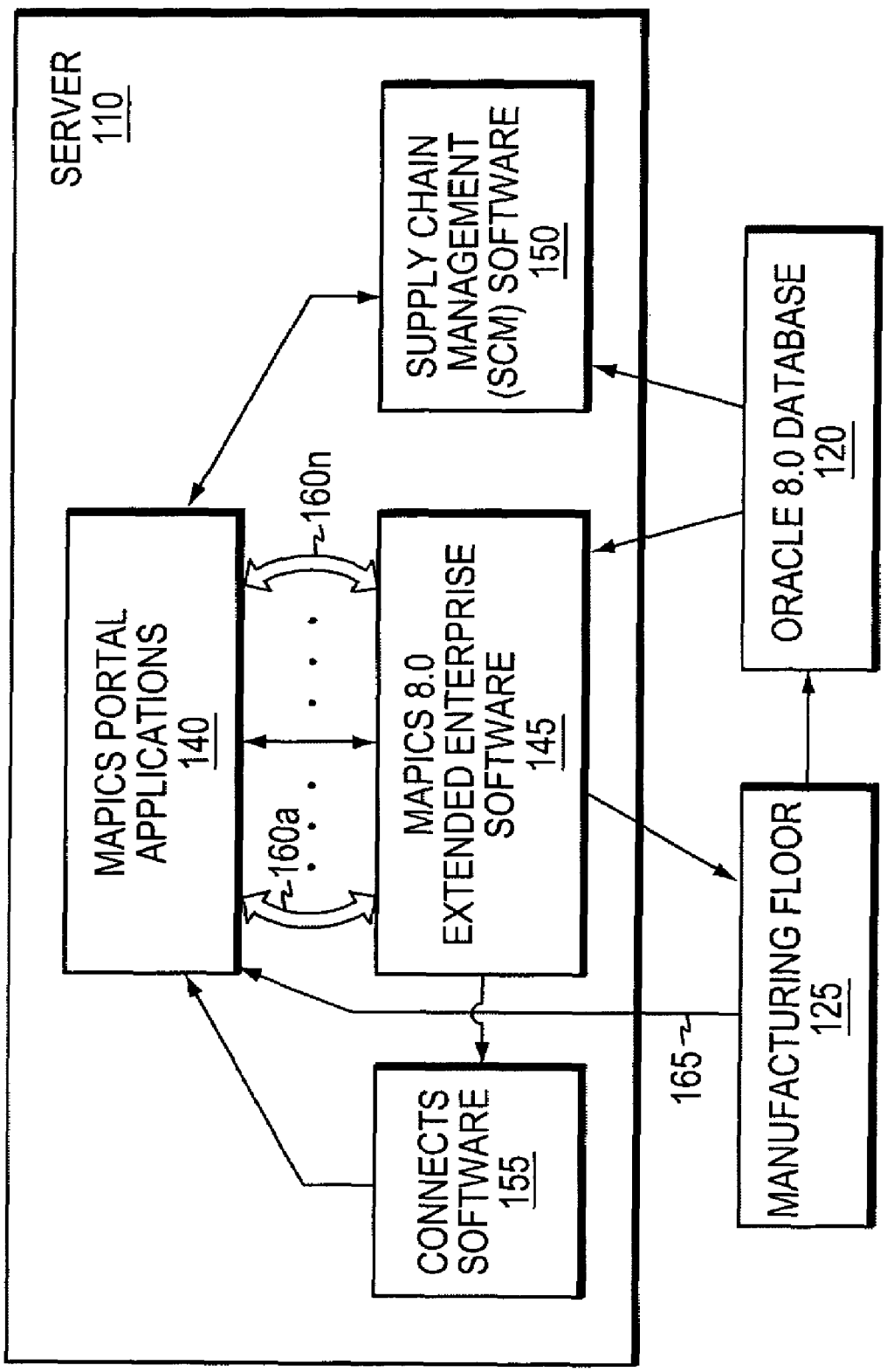
FIG. 3 is a block diagram of an illustrative commercial embodiment of a server, a database, and a manufacturing floor in a system for providing an extended manufacturing environment in accordance with the invention.

FIG. 3 depicts one commercial embodiment of the server 110, the database 120, and the manufacturing floor 125. As illustrated, the communications interface module 140 may be implemented using MAPICS Portal Applications, the manufacturing interface module 145 may be implemented using MAPICS 8.0 Extended Enterprise Software, the simulation module 150 may be implemented using Supply Chain Management (SCM) software, and the ordering module 155 may be implemented using Connects software, all of which are developed by MAPICS, Inc. of Alpharetta, Ga. The database 120 may be implemented using the Oracle 8.0 Database developed by Oracle Corporation of Redwood City, Calif.

The present invention may be provided as one or more computer-readable programs embodied on or in one or more articles of manufacture. The article of manufacture may be a floppy disk, a hard disk, a CD ROM, a flash memory card, a PROM, a RAM, a ROM, or a magnetic tape. In general, the computer-readable programs may be implemented in any programming language. Some examples of languages that can be used include C, C++, or JAVA. The software programs may be stored on or in one or more articles of manufacture as object code.

Variations, modifications, and other implementations of what is described herein will occur to those of ordinary skill in the art without departing from the spirit and the scope of the invention. The invention is not to be defined only by the preceding illustrative description.

What is claimed is:

1. A computer-readable medium storing code representing instructions to cause a computer to perform a process, the code comprising code to:
   receive, at a manufacturer's server, a change request associated with at least one product from a customer of the manufacturer;
   run a simulation, in response to a request from the customer via a remote client, to determine at least one impact of making the change request;
   automatically transmit, in response to the change request and based on the simulation, an order for a first portion of a plurality of supplies to a first supplier and an order for a second portion of the plurality of supplies to a second supplier, the plurality of supplies being needed by the manufacturer to manufacture the at least one product for the customer;
   receive an indicator that the order for the second portion of the plurality of supplies has been rejected by the second supplier;
   provide the customer in real-time with detailed information about the at least one product as it is being manufactured by the manufacturer; and
   restrict interactions between the customer and other customers, the first supplier, and the second supplier.

2. The computer-readable medium of claim 1 wherein the at least one impact includes whether the order for the at least one product can be filled by the manufacturer.

3. The computer-readable medium of claim 1 wherein the code to transmit includes code to transmit in response to the change request and without approval from the manufacturer.

4. The computer-readable medium of claim 1 wherein the at least one impact includes at least one of a loss of a ship date, a surcharge for re-assembling the at least one product, and an unexpected increase in price due to a change in sub-components of the at least one product.

5. The computer-readable medium of claim 1 wherein the code to receive comprises code to receive the change request which comprises a request for the plurality of supplies.

6. The computer-readable medium of claim 1 further comprising code to receive, at the manufacturer's server, a request for detailed product quality information from the customer.

7. A system embodied in a computer-readable medium and operable to provide an extended manufacturing environment, the system comprising:
- a manufacturing interface module configured to receive a change request from a customer of a manufacturer, automatically process the change request, and automatically pass control to an ordering module;
- a simulation module at the manufacturer configured to be triggered by the customer from a customer site separate from the manufacturer to run a simulation such that the customer can determine at least one impact of the change request at the manufacturer;
- the ordering module configured to automatically transmit an order for a plurality of supplies to a supplier of the plurality of supplies based on the simulation, the plurality of supplies being needed by the manufacturer to manufacture at least one product for the customer; and
- a communications interface module configured to provide the customer in real-time with detailed information about the product as it is being manufactured by the manufacturer and configured to control interactions between the customer and other customers, the supplier, and other suppliers,
- the manufacturing interface module configured to receive an indicator that the order for the plurality of supplies has been rejected by the supplier.

8. The system of claim 7 wherein the change request is associated with an order for the at least one product.

9. The system of claim 8 wherein the simulation module is configured to run the simulation to determine whether the order for the at least one product can be filled by the manufacturer.

10. The system of claim 7 wherein the change request is a request to change an existing order for the at least one product.

11. The system of claim 10 wherein the simulation module is capable of being triggered by the customer from the customer site to run the simulation to determine at least one of a loss of ship date, a surcharge for re-assembling the at least one product, and an unexpected increase in price due to a change in sub-components of the at least one product.

12. The system of claim 7 wherein the change request is related to a request for the plurality of supplies.

13. The system of claim 7 wherein the manufacturing interface module is further configured to receive from the customer a request for detailed product quality information.

14. An article of manufacture having computer-readable program means embodied therein and executable on a computer for providing an extended manufacturing environment, comprising:
- computer-readable program means for receiving, at a manufacturer's server, a change request from a customer of the manufacturer;
- computer-readable program means for a customer to run a simulation from a remote client to determine at least one impact at the manufacturer of the change request;
- computer-readable program means for automatically processing the change request at the manufacturer's server;
- computer-readable program means for automatically transmitting an order for supplies from the manufacturer's server to a supplier of the supplies based on the simulation, the supplies needed by the manufacturer to manufacture a first product for the customer and a second product different from the first product;
- computer-readable program means for providing the customer in real-time with detailed information about the product as it is being manufactured by the manufacturer;
- computer-readable program means for controlling interactions between the customer and other customers, the supplier, and other suppliers; and
- computer-readable program means for receiving from the supplier a first indicator that a portion of the order associated with the first product has been rejected and a second indicator that a portion of the order associated with the second product has been accepted.

15. The computer-readable medium of claim 1 wherein the detailed information includes quality information about the being-manufactured product.

16. The computer-readable medium of claim 1 wherein the detailed information includes quantity information about the being-manufactured product.

17. The computer-readable medium of claim 1 wherein the detailed information includes information associated with a location of the at least one product within a manufacturing floor, the location being associated with a workstation at the manufacturing floor, the information associated with the location being defined in response to a scanning.

18. The computer-readable medium of claim 1 wherein the detailed information includes statistical process control information about the being-manufactured product.

19. The system of claim 7 wherein the detailed information includes at least one of quality information or quantity information about the being-manufactured product.

20. The system of claim 7 wherein the detailed information includes the location within the manufacturer of the being-manufactured product.

21. The system of claim 7 wherein the detailed information includes statistical process control information about the being-manufactured product.

22. The computer-readable program means of claim 14 wherein the detailed information includes at least one of quality information or quantity information about the being-manufactured product.

23. The computer-readable program means of claim 14 wherein the detailed information includes the location within the manufacturer of the being-manufactured product.

24. The computer-readable program means of claim 14 wherein the detailed information includes statistical process control information about the being-manufactured product.

25. The computer-readable medium of claim 1 wherein the interactions comprise discussion threads,
the computer-readable medium further comprising code to:
send an alert based on at least a portion of the discussion threads; and
monitor for an acknowledgement of the alert.

26. The computer-readable medium of claim 1 wherein the interactions comprise streaming video.

27. The system of claim 7 wherein the interactions comprise at least one of discussion threads or streaming video.

28. The computer-readable program of claim 14 wherein the interactions comprise at least one of discussion threads or streaming video.

29. The computer-readable medium of claim 1 wherein the order for the second portion of the plurality of supplies is rejected based on the at least one product.

30. The computer-readable medium of claim 1 further comprising code to automatically upload a list of approved suppliers defined by the customer, the first supplier and the second supplier being selected from the list of approved suppliers.

31. The computer-readable medium of claim 1 wherein the code to provide includes code to provide via a channelized view uniquely customized for the customer and selected from a set of channelized views, the code to restrict includes code to restrict via the channelized view.

32. The system of claim 7 wherein the order for the plurality of supplies is transmitted to the supplier and the control is passed to the ordering module, both without approval by the manufacturer.

33. The computer-readable medium of claim 1 further comprising code to receive from the customer via the remote client an indicator of a rejection of the change request after the running of the simulation.

34. The computer-readable medium of claim 1 wherein the order for the first portion of the plurality of supplies is a first updated order, the order for the second portion of the plurality of supplies is a second updated order.

35. The system of claim 7 wherein the communications interface module is configured to provide the detailed information to the customer at a remote client, the simulation is run via the remote client.

36. The system of claim 7 wherein the simulation module is configured to receive from the customer an indicator of a rejection of the change request after the simulation is run.

37. The computer-readable program of claim 14 wherein the change request is associated with the at least one product.

38. The computer-readable program of claim 14 wherein the computer-readable program means associated with the simulation is configured to receive from the customer an indicator of a rejection of the change request.

* * * * *